(12) United States Patent
Gerhart et al.

(10) Patent No.: US 9,878,288 B2
(45) Date of Patent: Jan. 30, 2018

(54) AMMONIA GAS GENERATOR, METHOD FOR PRODUCING AMMONIA AND USE OF THE SAME FOR REDUCING NITROGEN OXIDES IN EXHAUST GASES

(71) Applicant: ALZCHEM AG, Trostberg (DE)

(72) Inventors: Christian Gerhart, Siegsdorf (DE); Henning Middelmann, Herdecke (DE)

(73) Assignee: ALZCHEM AG, Trostberg (DE)

( * ) Notice: Subject to any disclaimer, the term of this patent is extended or adjusted under 35 U.S.C. 154(b) by 0 days.

(21) Appl. No.: 14/646,453

(22) PCT Filed: Dec. 19, 2013

(86) PCT No.: PCT/EP2013/077440
§ 371 (c)(1),
(2) Date: May 21, 2015

(87) PCT Pub. No.: WO2014/096220
PCT Pub. Date: Jun. 26, 2014

(65) Prior Publication Data
US 2015/0315033 A1    Nov. 5, 2015

(30) Foreign Application Priority Data

Dec. 21, 2012  (DE) .................. 10 2012 025 112
Dec. 21, 2012  (DE) .................. 10 2012 025 113

(51) Int. Cl.
*F01N 3/00* (2006.01)
*B01D 53/94* (2006.01)
(Continued)

(52) U.S. Cl.
CPC ......... *B01D 53/9431* (2013.01); *B01D 53/90* (2013.01); *C01C 1/08* (2013.01);
(Continued)

(58) Field of Classification Search
CPC .... B01D 2251/2062; B01D 2251/2067; B01D 2255/20707; B01D 53/90; B01D 53/9431;
(Continued)

(56) References Cited

U.S. PATENT DOCUMENTS

| 5,628,186 A | 5/1997 | Schmelz |
| 8,151,561 B2 * | 4/2012 | Stiebinger .......... B01D 53/9431 60/295 |

(Continued)

FOREIGN PATENT DOCUMENTS

| DE | 4038054 | 6/1992 |
| DE | 4203807 | 8/1993 |

(Continued)

OTHER PUBLICATIONS

EP 0615777 Translation; Aug. 1997; Kreutmair.*
(Continued)

*Primary Examiner* — Jesse Bogue
(74) *Attorney, Agent, or Firm* — Kilpatrick Townsend & Stockton LLP

(57) ABSTRACT

An ammonia gas generator for producing ammonia from a solution of an ammonia precursor substance, comprising a catalyst unit that comprises a catalyst for the decomposition and/or hydrolysis of ammonia precursor substances into ammonia and a mixing chamber provided upstream of the catalyst; an injection device for injecting the solution of the ammonia precursor substance into the mixing chamber; at least one inlet for the carrier gas; and an outlet for the formed ammonia gas, said ammonia gas generator also comprising a perforated disc.

27 Claims, 3 Drawing Sheets

(51) Int. Cl.
- *F01N 3/20* (2006.01)
- *B01D 53/90* (2006.01)
- *C01C 1/08* (2006.01)
- *F01N 3/28* (2006.01)
- *F01N 3/035* (2006.01)

(52) U.S. Cl.
CPC .............. *C01C 1/086* (2013.01); *F01N 3/035* (2013.01); *F01N 3/206* (2013.01); *F01N 3/2066* (2013.01); *F01N 3/2892* (2013.01); *B01D 53/9477* (2013.01); *B01D 2251/2062* (2013.01); *B01D 2251/2067* (2013.01); *B01D 2255/20707* (2013.01); *F01N 2240/25* (2013.01); *Y02T 10/24* (2013.01)

(58) Field of Classification Search
CPC ....... B01D 53/9477; C01C 1/08; C01C 1/086; F01N 2240/25; F01N 3/035; F01N 3/206; F01N 3/2066; F01N 3/2892; Y02T 10/24
See application file for complete search history.

(56) References Cited

U.S. PATENT DOCUMENTS

| | | | | |
|---|---|---|---|---|
| 2003/0029164 A1* | 2/2003 | Hernier | ............ | B01D 53/9431 60/286 |
| 2004/0040288 A1* | 3/2004 | Jacob | ................ | B01D 53/8631 60/286 |
| 2006/0101811 A1* | 5/2006 | Linna | ................ | B01D 53/9495 60/286 |
| 2007/0234709 A1* | 10/2007 | Bork | ....................... | F01N 11/00 60/282 |
| 2009/0127511 A1* | 5/2009 | Bruck | ................... | B01D 53/90 252/372 |
| 2009/0297417 A1* | 12/2009 | Sun | ......................... | B01B 1/005 423/239.1 |
| 2010/0170225 A1* | 7/2010 | Opris | ................... | F01N 3/2066 60/286 |
| 2012/0087840 A1 | 4/2012 | Hirschberg | | |

FOREIGN PATENT DOCUMENTS

| | | | |
|---|---|---|---|
| DE | 4230056 | 3/1994 | |
| DE | 4417238 | 9/1994 | |
| DE | 4315278 | 11/1994 | |
| DE | 19515352 | 11/1995 | |
| DE | 102008063488 | 6/2010 | |
| EP | 0615777 B1 * | 8/1997 | ......... B01D 53/9409 |
| JP | 2006122792 | 5/2006 | |

OTHER PUBLICATIONS

International Patent Application No. PCT/EP2013/077440, International Search Report dated May 6, 2014.
German Application No. 10 2012 025 112.2, Search Report dated Nov. 8, 2013.
German Application No. 10 2012 025 113.0, Search Report dated Nov. 12, 2013.
PCT/EP2013/077440, International Application No. PCT/EP2013/077440, English translation of International Preliminary Report on Patentability dated Mar. 31, 2015.
PCT/EP2013/077440, International Application No. PCT/EP2013/077440, International Preliminary Report on Patentability dated Mar. 31, 2015.

* cited by examiner

AMMONIA GAS GENERATOR, METHOD FOR PRODUCING AMMONIA AND USE OF THE SAME FOR REDUCING NITROGEN OXIDES IN EXHAUST GASES

PRIOR RELATED APPLICATIONS

This application is a National Phase application of International Application No. PCT/EP2013/077440, filed Dec. 19, 2013, which claims priority to German Application No. 10 2012 025 113.0, filed Dec. 21, 2012, and German Application No. 10 2012 025 112.2, filed Dec. 21, 2012, each of which is incorporated herein by reference in its entirety.

The present invention relates to an ammonia gas generator for generating ammonia from an ammonia precursor substance, to a method for generating ammonia, and to the use thereof in exhaust gas after-treatment systems for reducing nitrogen oxides in exhaust gases.

Exhaust gases of internal combustion engines often contain substances of which emission into the environment is undesirable. In many countries, therefore, limits are set for the emission of such harmful substances, for example in the exhaust gas of industrial plants or motor vehicles, which limits must be observed. In addition to a number of other harmful substances, these harmful substances also include nitrogen oxides ($NO_x$), such as in particular nitrogen monoxide (NO) or nitrogen dioxide ($NO_2$).

The emission of said nitrogen oxides from exhaust gases of internal combustion engines can be reduced in various ways. Prominence is to be given at this point to reduction by additional exhaust gas after-treatment measures, which make use in particular of selective catalytic reduction (SCR). A common feature of these methods is the addition of a reducing agent to the exhaust gas, which reducing agent acts selectively on the nitrogen oxides, whereupon conversion of the nitrogen oxides takes place in the presence of a corresponding catalyst (SCR catalyst). The nitrogen oxides are thereby converted into less environmentally harmful substances, for example nitrogen and water.

A reducing agent for nitrogen oxides which is already in use today is urea ($H_2N$—CO—$NH_2$), which is added to the exhaust gas in the form of an aqueous urea solution. The urea is able to decompose in the exhaust gas stream to ammonia ($NH_3$), for example by the action of heat (thermolysis) and/or by reaction with water (hydrolysis). The ammonia thus formed constitutes the actual reducing agent for nitrogen oxides.

The development of exhaust gas after-treatment systems for motor vehicles has been ongoing for some time and is the subject of many publications. For example, European patent specification EP 487 886 B1 describes a method for selective catalytic $NO_x$ reduction in oxygen-containing exhaust gases of diesel engines, in which urea and the thermolysis products thereof are used as the reducing agent. There is additionally described an apparatus for generating ammonia in the form of a tubular evaporator which comprises a spraying device, an evaporator having an evaporator tube and a hydrolysis catalyst. Furthermore, European patent specification EP 1 052 009 B1 describes a process and an apparatus for carrying out the process for thermal hydrolysis and metering of urea or urea solutions in a reactor by means of an exhaust gas partial stream. In the process, a partial stream of the exhaust gas is removed from an exhaust gas line upstream of the SCR catalyst and passed through the reactor, the partial stream loaded with ammonia after hydrolysis in the reactor being fed back into the exhaust gas line likewise upstream of the SCR catalyst.

In addition, European patent specification EP 1 338 562 B1 describes an apparatus and a method which uses the catalytic reduction of nitrogen oxides by ammonia. The ammonia is obtained under conditions of rapid thermolysis from urea in solid form and under hydrolysis conditions from isocyanic acid and is fed to the exhaust gas stream of a motor vehicle.

Furthermore, European patent application EP 1 348 840 A1 describes an exhaust gas cleaning device as a module in the form of a 20-foot container which can be transported as a whole. The device is operated in such a manner that a urea or ammonia solution is injected directly into the exhaust gas stream by means of an injection device. The nitrogen oxides contained in the exhaust gas are reduced on an SCR catalyst.

Furthermore, German patent application DE 10 2006 023 147 A1 describes a device for generating ammonia which is part of an exhaust gas after-treatment system.

In addition, international application WO 2008/077 587 A1 and WO 2008/077588 A1 further describe a method for the selective catalytic reduction of nitrogen oxides in exhaust gases of motor vehicles by means of aqueous guanidinium salt solutions. In these methods, a reactor which generates ammonia from the aqueous guanidinium salt solutions is used.

More recent developments in the field of exhaust gas after-treatment are the subject of current works. Thus, the concept of generating ammonia outside an exhaust gas line has recently also been pursued. Explanations of generators and methods of operating such generators can be found in international applications PCT/EP2012/062757, PCT/EP2012/062750 and PCT/EP2012/062752.

Although ammonia gas generators have been known for some time, the technology has not hitherto been implemented in a motor vehicle or another use. To date, the concept of injecting an ammonia precursor substance directly into the exhaust gas stream of an internal combustion engine has been pursued, said ammonia precursor substance decomposing by suitable measures in the exhaust gas line to form the actual reducing agent. However, because of incomplete decomposition or secondary reactions of decomposition products in the exhaust gas line, deposits are consistently observed, which result in damage to the catalysts and filters which are also present in the exhaust gas line.

Accordingly, the object of the present invention is to provide an ammonia gas generator and a method for producing ammonia, in particular for reducing nitrogen oxides in exhaust gases of motor vehicles, which overcomes the disadvantages of the prior art. The ammonia gas generator is preferably provided such that it is arranged outside an exhaust gas line of an exhaust gas system of an internal combustion engine. It is then possible according to the invention to introduce into the exhaust gas the ammonia that is generated, rather than an ammonia precursor compound. Furthermore, it is to be possible to carry out the method for generating ammonia by means of simple apparatus-based measures, to provide a high rate of conversion of ammonia precursor substances into ammonia gas, and to allow the generator to be used for a long time without having to be maintained.

These objects are achieved by an ammonia gas generator according to claim 1 and by a method for generating ammonia according to claim 4.

The invention relates to an ammonia gas generator for generating ammonia from a solution of an ammonia precursor substance, comprising i) a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{Mix}$, ii) an injection device for introducing the solution of the ammonia precursor substance into the mixing chamber, iii) at least one inlet for a carrier gas, and iv) an outlet for the ammonia gas that is formed, wherein the ammonia gas generator further comprises v) a perforated disc through which the carrier gas is introduced into the mixing chamber in the form of a plurality of parallel jets.

It should be emphasised at this point that an ammonia gas generator according to the present invention is a separate modular unit for generating ammonia from ammonia precursor substances. Such a modular unit can be used, for example, for reducing nitrogen oxides in industrial exhaust gases or for the exhaust gas after-treatment of exhaust gases from internal combustion engines, for example diesel engines. Said ammonia gas generator can work independently or can be operated by means of exhaust gas side streams; in that case, however, the ammonia that is formed is introduced into the exhaust gas stream and nitrogen oxides are not reduced by means of ammonia until a subsequent process step. If an ammonia gas generator according to the invention is used as a separate modular unit in an exhaust gas after-treatment system of an internal combustion engine, for example of a diesel engine, it is thus possible to reduce the nitrogen oxides in the exhaust gas stream without introducing further catalysts for cleaving ammonia precursor substances or other components into the exhaust gas stream itself. The ammonia generated by the ammonia gas generator according to the invention can thus be introduced into the exhaust gas stream according to requirements. Any shortening of the lifetime of the SCR catalyst by contaminants in the form of deposits of, for example, ammonia precursor substances or products of the cleavage of ammonia precursor substances is likewise avoided. In particular, according to the invention, the ammonia itself that is generated, rather than ammonia precursor compounds, is introduced into the exhaust gas stream.

Furthermore, in connection with the present invention, an injection device which comprises a nozzle is to be understood as being any device or nozzle by means of which a solution, preferably an aqueous solution, of an ammonia precursor substance is sprayed, atomised or otherwise formed into drops, wherein the solution of the ammonia precursor substance is formed into drops which in particular have a drop or droplet diameter $D_{32}$ of from 26 to 100 µm, more preferably from 26 to 49 µm and most preferably from 26 to 40 µm. The drop or droplet diameter $D_{32}$ refers in connection with the present invention to the Sauter diameter according to German industrial standard DIN 66 141.

Furthermore, a catalyst unit according to the present invention is to be understood as being a modular unit which comprises a housing for receiving a catalyst, a mixing chamber provided upstream of the catalyst in the direction of flow, and at least one catalyst for the decomposition and/or hydrolysis of ammonia precursor substances into ammonia, the catalyst having a catalyst volume $V_{Cat}$ and the mixing chamber having a mixing chamber volume $V_{Mix}$. The mixing chamber is delimited in the direction of flow on one side by the catalyst end face and on the other side by a perforated disc. The catalyst unit can optionally additionally comprise an outlet chamber, provided downstream of the catalyst in the direction of flow, for discharging the ammonia gas that is formed.

It has been shown that, despite optimal injection geometry (angle and distance), in particular in an application with a carrier gas stream, the droplets are not distributed equally on the catalyst end wall in an optimal manner. Surprisingly, it has been found that, when operating the ammonia gas generator with a carrier gas stream (also referred to in the following synonymously as the transport gas stream) guided perpendicularly to the catalyst end face, deposits on the walls of the catalyst unit in the region of the mixing chamber can be prevented and permanently good mixing of the carrier gas (also referred to in the following synonymously as the transport gas) and the solution of the ammonia precursor substance can be provided. This effect is particularly noticeable when the carrier gas is introduced into the mixing chamber in the form of a plurality of parallel jets which are generated by a perforated disc. If such a carrier gas stream in the form of parallel jets guided perpendicularly to the catalyst end face is not used, the wall of the catalyst unit in the region of the mixing chamber can become wetted through the spraying of the solutions of ammonia precursor substance into the mixing chamber and undesirable secondary reactions, for example polymerisation of the ammonia precursor substance, can occur. Said secondary reactions lead to undesirable deposits in the region of the mixing chamber, as a result of which thorough mixing of the carrier gas and the solution of the ammonia precursor substance, which is of great importance for the functioning of the generator, is no longer possible on a sustained basis. In addition, because of inadequate mixing of the carrier gas with the solution, further deposits can be observed in and on the catalyst itself. As a result of the carrier gas stream in the form of parallel jets of the carrier gas guided perpendicularly to the catalyst end face, a curtain flow with the droplets is generated and is guided axially towards the hydrolysis catalyst onto the hydrolysis catalyst end face. Said curtain flow facilitates a very good conversion to ammonia at the catalyst.

The carrier gas is supplied in the head region of the generator, preferably at the level of the device for injecting the ammonia precursor solution into the catalyst unit or into the mixing chamber.

The carrier gas and in particular the carrier gas stream guided perpendicularly to the catalyst end face, and most preferably the plurality of parallel jets generated by the perforated disc, is/are preferably introduced into the mixing chamber at a temperature of up to 550° C., preferably at a temperature of from 250 to 550° C., more preferably at a temperature of from 250 to 400° C. and most preferably at a temperature of from 300 to 350° C. However, it can also be provided that the carrier gas, and in particular the carrier gas stream guided perpendicularly to the catalyst end face, is introduced into the mixing chamber at a temperature of less than 250° C., in particular of less than 200° C., more preferably of less than 150° C., particularly preferably of less than 100° C. and most preferably of less than 80° C., whereby the temperature should at the same time be at least 10° C., in particular at least 20° C. and most preferably 25° C.

It has further been surprisingly shown that, by using a perforated disc, the carrier gas stream that is introduced can be divided into a plurality of partial streams, and, as a result, a particularly even distribution of the resulting drops on the catalyst end face can be produced. The even distribution of the resulting drops on the catalyst end face can be further improved in particular if the nozzle opening of the nozzle is arranged in the centre of the perforated disc. It is thus possible with the plurality of partial streams of the carrier gas to provide a jacket for the sprayed drops which encloses them on all sides. Said jacket prevents ammonia precursor substances or undesirable degradation products thereof from being deposited on the inside walls of the catalyst unit.

Accordingly, in a preferred embodiment, the present invention also relates to an ammonia gas generator which comprises a perforated disc, in the centre of which a nozzle is arranged, in particular in the centre of which at least one nozzle opening of the nozzle is arranged.

According to a preferred embodiment of the present invention, the ammonia gas generator comprises an injection device which comprises a nozzle which in particular generates drops having a Sauter diameter $D_{32}$ of from 26 to 100 μm. Most preference is given to an ammonia gas generator which comprises a perforated disc, in the centre of which a nozzle opening of the nozzle is arranged, the nozzle in particular generating drops having a Sauter diameter $D_{32}$ of from 26 to 100 μm, more preferably from 26 to 49 μm and most preferably from 26 to 40 μm.

In particular, there is provided with the present invention an ammonia gas generator which works independently of the exhaust gas stream of an internal combustion engine or of an industrial plant, that is to say without the aid of an exhaust gas stream or exhaust gas partial stream from an internal combustion gas as carrier gas. In particular, in the ammonia gas generator according to the invention, ammonia is formed from an ammonia precursor substance in the absence of an exhaust gas stream.

According to a further aspect, therefore, the present invention also relates to a method for producing ammonia, in particular for continuously producing ammonia, from a solution of an ammonia precursor substance, in which the ammonia gas generator described herein is used and the carrier gas is introduced or injected into the mixing chamber or catalyst unit i) in the form of a carrier gas stream guided perpendicularly to the catalyst end face or ii) in the form of a plurality of parallel jets, and in particular the parallel jets are generated in particular by a perforated disc. In this way, it can be provided that the solution of the ammonia precursor substance is introduced or injected into the catalyst unit or the mixing chamber in such a manner that the solution is introduced or injected into the catalyst unit or mixing chamber in the form of drops having a Sauter diameter $D_{32}$ of from 26 to 100 μm. Particular preference is given to a method in which a carrier gas in the form of a carrier gas stream guided perpendicularly to the catalyst end face, in particular in the form of parallel jets, is injected or introduced into the catalyst unit or the mixing chamber. It can further be provided, particularly preferably, that the solution of the ammonia precursor substance is introduced in the form of an aerosol into a plurality of parallel jets of the carrier gas.

Surprisingly, it has been shown that, in addition to the improvement as a result of the jets of the carrier gas guided in parallel, further deposits can be avoided and the conversion rate can be improved further. As a result of the targeted selection of the nozzle or of the targeted use of a nozzle which generates drops having a Sauter diameter of from 26 to 100 μm, the drops are distributed over almost the entire flow cross section and the catalyst end face is accordingly wetted more evenly. Without being bound to theory, it can be stated that drops of too small a size have too low an inertia. As a result, the drop-containing flow is applied only to a portion of the catalyst end face. Owing to the greater inertia of the larger drops, a drop-containing flow can be provided which wets almost 100% of the catalyst end face, in particular also in the presence of a carrier gas stream.

In addition, it has been found that droplets having a Sauter diameter $D_{32}$ of from 26 to 100 μm are deflected less by the carrier gas flow, leading to a more homogeneous spray pattern, particularly in the outer regions (region greater than 80% of the diameter) of the catalyst end face, and a more even distribution on the catalyst overall. On account of their inertia, droplets having a Sauter diameter $D_{32}$ of from 26 to 100 μm retain the original spray angle predefined by the nozzle until they come into contact with the catalyst end face, and more even wetting of the catalyst end face corresponding to the given spray angle of the nozzle is therefore achieved.

At the same time, by using a nozzle which generates drops having a Sauter diameter $D_{32}$ of from 26 to 100 μm, it was possible to achieve a simple set-up and a compact construction of the ammonia gas generator itself.

Furthermore, it has been found, wholly unforeseeably, that the necessary energy requirement or pressure for atomising droplets having a larger Sauter diameter (which corresponds to the formation of fewer new liquid surfaces) is significantly smaller. This results in a particularly simple construction of the generator.

According to a preferred embodiment of the present invention, the injection device can comprise a nozzle which generates drops having a Sauter diameter $D_{32}$ of 26 μm, in particular at least 30 μm and particularly preferably at least 32 μm, the droplets at the same time or independently thereof having a Sauter diameter of not more than 100 μm, in particular not more than 90 μm, particularly preferably not more than 80 μm, particularly preferably not more than 70 μm, most preferably not more than 60 μm and most preferably not more than 49 μm and even more preferably not more than 40 μm.

Accordingly, it is provided according to the present invention that the injection device in turn comprises a nozzle which generates droplets having a droplet diameter $D_{32}$ in a defined range. By using such nozzles, a degree of ammonia formation AG of >97% can be achieved. In addition, the solution can be distributed particularly evenly on the catalyst end face. The degree of ammonia formation AG is defined here and in the following as the molar amount of $NH_3$ generated in the ammonia gas generator, based on the molar amount of ammonia which can theoretically be generated in the case of complete hydrolysis of the ammonia precursor substance. According to the present invention, a degree of ammonia formation of >97% is considered to be complete conversion.

According to the invention, an even droplet load prevents the maximum end face load from being exceeded in individual annular regions. Only in that manner can it be ensured that an approximately complete conversion takes place on the entire catalyst end face and annular deposits do not occur on the catalyst end face with prolonged use. Additional maintenance can thus be avoided.

According to a particularly preferred variant, it can be provided in particular that the injection device in turn comprises a nozzle which is a so-called two-component nozzle according to the present invention. A two-component nozzle is here understood as being a nozzle which uses a pressurised gas, generally air, as the propellant to break the surface of the liquid phase and thus form droplets. Said pressurised gas is also referred to as atomising air. Accordingly, the present invention also relates to an ammonia gas generator which comprises an injection device which is a two-component nozzle in which the solution to be introduced into the mixing chamber is acted upon by compressed air. Preference is given to a two-component nozzle having a Sauter diameter $D_{32}$ of from 26 to 100 µm.

Alternatively or independently thereof, it can also be provided that the ammonia gas generator comprises a nozzle which has a first number of nozzle openings for introducing the solution into the mixing chamber, which is surrounded in an annular manner by a second number of nozzle openings for introducing compressed air or carrier gas into the mixing chamber.

Alternatively, it can also be provided that the ammonia gas generator comprises a nozzle which is operated without compressed air. This so-called single-component nozzle or injector works by breaking up the liquid mechanically without an additional air stream. Preference is given to a single-component nozzle having a Sauter diameter $D_{32}$ of from 26 to 100 µm. Particular preference is given to a single-component nozzle having a plurality of openings or drilled holes. Most preference is given to the combination of more than one single-component nozzle for introducing the solution into the ammonia gas generator.

As already described, the ammonia gas generator can be operated independently of or depending on an exhaust gas stream of an internal combustion engine or of an industrial plant. Accordingly, in the method for producing ammonia gas there can be used a carrier gas which has a temperature $T_{(K)}$ in the range of from 10 to 550° C. Particular preference is given, however, to a method in which there is used a carrier gas which is introduced into the mixing chamber (51) at a temperature $T_{(K)}$ in the range of from 10 to 200° C.

Surprisingly, it has been found that the ammonia gas generator can also be operated with a carrier gas or a carrier gas stream having a temperature below the decomposition temperature (decomposition temperature >200° C.) of the ammonia precursor substance. The required energy for the decomposition is here provided substantially by the heatable catalyst. Surprisingly, this supply of energy is sufficient to achieve complete conversion and a high conversion rate of >97%. Alternatively, this method can also be carried out with a carrier gas having a temperature $T_{(K)}$ in the range of from 250 to 550° C.

Also preferably, in this method the solution of the ammonia precursor substance can be introduced in the form of an aerosol into the plurality of parallel jets of the carrier gas. Said aerosol can be generated in particular by a two-component nozzle or a single-component nozzle.

Furthermore, it can be provided, without limitation, that, in the method, the solution of the ammonia precursor substance is introduced into the mixing chamber together with or separately from the carrier gas. In particular, however, it is provided that the carrier gas is introduced into the mixing chamber in parallel with the solution of the ammonia precursor substance, in particular in the form of a bundle of parallel jets.

In a method according to the invention it can further be provided that the carrier gas is introduced into the mixing chamber with an excess pressure. Independently or at the same time, it can be provided that the carrier gas is introduced into the mixing chamber with a pressure which is necessary to overcome a pressure difference delta $p_{(K)}$ in the range of from 10 to 100 mbar between the inlet for the carrier gas and the outlet for the ammonia gas. Preference is further given to a method in which the carrier gas is drawn through the mixing chamber with a low pressure post reactor.

Accordingly, during operation of the generator, no further measures are necessary to introduce the resulting ammonia gas for reducing nitrogen oxides in exhaust gases of internal combustion engines or industrial exhaust gases. The low pressure could here be generated in particular by a Venturi mixer in the exhaust gas line of the internal combustion engine or of the industrial plant. By means of the low pressure, the carrier gas in the form of a carrier gas stream is drawn through the ammonia gas generator. The ammonia gas generator can thus be operated without excess pressure. Accordingly, by means of the low pressure, a pressure difference delta $p_{(K)}$ in the range of from 10 to 100 mbar between the inlet for the carrier gas and the outlet for the ammonia gas can particularly advantageously be overcome. These measures, too, allow exhaust gas side streams or partial streams to be dispensed with, and in particular ambient air can be used as the carrier gas.

Accordingly, the present invention also relates to a method for reducing nitrogen oxides in exhaust gases of internal combustion engines, comprising a method for generating ammonia of the type described herein, in which the ammonia gas that is formed is introduced into the exhaust gas line of the internal combustion engine directly into a Venturi mixer.

According to a further development of the present invention, it is also provided that the ratio of the volume of the mixing chamber $V_{Mix}$ to the volume of the catalyst $V_{Cat}$ corresponds to the ratio of from 1:1 to 5:1. Surprisingly, it has been shown that the injected ammonia precursor substance can be decomposed completely (conversion >97%) into ammonia if the droplets of the solution are already partially evaporated before they come into contact with the catalyst end face. This can be ensured by making the volume of the mixing chamber greater than the volume of the catalyst. Partial evaporation of the droplets means that sufficient energy is already supplied to the solution, so that excessive cooling at the catalyst end face, as a result of drops which are too large, is avoided and poorer decomposition or secondary product formation is thus counteracted. In addition, an appropriate mixing chamber volume $V_{Mix}$ ensures that the sprayed ammonia precursor substance in the form of an aerosol distributed homogeneously in the transport gas stream comes into contact with the catalyst over the cross section, and spots having too high a concentration, which in turn would result in a poorer conversion, are avoided. Most preferably, it is provided that the ratio of the volume of the mixing chamber $V_{Mix}$ to the volume of the catalyst $V_{Cat}$ is from 2:1 to 5:1, particularly preferably from 1:1 to 5:1, particularly preferably from 3:1 to 5:1 and most preferably from 3.5:1 to 5:1.

Within the scope of the present invention there can be used as the catalyst for the decomposition and/or hydrolysis of ammonia precursor substances any catalyst which facilitates the release of ammonia from the precursor substance under catalytic conditions. A preferred catalyst hydrolyses the ammonia precursor substance to ammonia and further harmless substances such as nitrogen and carbon dioxide and water. The catalyst is thus preferably a hydrolysis catalyst.

If an ammonia precursor substance solution, for example a guanidinium salt solution, in particular a guanidinium formate solution, a urea solution or mixtures thereof, is used, the catalytic decomposition to ammonia can be carried out in the presence of catalytically active, non-oxidation-active coatings of oxides selected from the following group: titanium dioxide, aluminium oxide and silicon dioxide and mixtures thereof, and/or hydrothermally stable zeolites which are completely or partially metal-exchanged, in particular iron zeolites of the ZSM 5 or BEA type. Suitable metals are in particular the subgroup elements and preferably iron or copper. The metal oxides such as titanium oxide, aluminium oxide and silicon dioxide are preferably applied to metallic substrate materials, such as, for example, heat-conducting alloys (in particular chromium-aluminium steels).

Particularly preferred catalysts are hydrolysis catalysts which comprise in particular catalytically active coatings of titanium dioxide, aluminium oxide and silicon dioxide and mixtures thereof.

Alternatively, the catalytic decomposition of the ammonia precursor substance, the guanidinium formate solutions or the other components can also take place to ammonia and carbon dioxide, there being used catalytically active coatings of oxides selected from the following group: titanium dioxide, aluminium oxide and silicon dioxide and mixtures thereof, and/or hydrothermally stable zeolites which are completely or partially metal-exchanged, which coatings are impregnated with gold and/or palladium as oxidation-active components. The corresponding catalysts having palladium and/or gold as active components preferably have a noble metal content of from 0.001 to 2 wt. %, in particular from 0.01 to 1 wt. %. With the aid of such oxidation catalysts it is possible to avoid, as early as in the ammonia generation, the undesirable formation of carbon monoxide as a secondary product in the decomposition of the guanidinium salt, in particular in the decomposition of formates.

There is preferably used for the catalytic decomposition of the guanidinium formate, and optionally the further components, a catalytic coating having palladium/and/or gold as active components having a noble metal content of from 0.001 to 2 wt. %, in particular from 0.01 to 1 wt. %.

Accordingly, the present invention also relates to an ammonia gas generator which comprises a hydrolysis catalyst having a catalytically active coating which is impregnated with gold and/or palladium, in particular having a content of gold and/or palladium of from 0.001 to 2 wt. % (based on the catalytic coating). Further preferably, said catalyst has a catalytically active coating of oxides selected from the following group: titanium dioxide, aluminium oxide and silicon dioxide and mixtures thereof, and/or hydrothermally stable zeolites, which coating is impregnated with gold and/or palladium, the content of gold and/or palladium further preferably being from 0.001 to 2 wt. % (based on the catalytic coating).

It is possible within the scope of the present invention that a hydrolysis catalyst is used which consists, in the direction of flow, of at least two portions, the first portion comprising non-oxidation-active coatings and the second portion comprising oxidation-active coatings. Preferably, from 5 to 90 vol. % of said catalyst consists of non-oxidation-active coatings and from 10 to 95 vol. % consists of oxidation-active coatings. In particular, from 15 to 80 vol. % of said catalyst consists of non-oxidation-active coatings and from 20 to 85 vol. % consists of oxidation-active coatings. Alternatively, the hydrolysis can also be carried out in the presence of two catalysts arranged one behind the other, the first catalyst comprising non-oxidation-active coatings and the second catalyst comprising oxidation-active coatings. Further preferably, the first hydrolysis catalyst can also be a heated catalyst and the second hydrolysis catalyst can be an unheated catalyst.

In addition, it can be provided that a hydrolysis catalyst is used which consists of at least two portions, the first portion arranged in the direction of flow being in the form of a heated catalyst and the second portion arranged in the direction of flow being in the form of an unheated catalyst. Preferably, the catalyst consists of from 5 to 50 vol. % of the first portion and from 50 to 95 vol. % of the second portion.

According to a particularly preferred embodiment of the present invention it is therefore provided that the ammonia gas generator comprises a catalyst unit having an at least two-part, particularly preferably at least three-part, hydrolysis catalyst, of which the first part in the direction of flow is in the form of a heated catalyst, which preferably has direct electric resistance heating and/or jacket heating, while the second part is in the form of an unheated catalyst which is most preferably followed downstream, as a third part, by an unheated catalyst with a mixer structure.

It has been found that, for complete catalytic conversion of the ammonia precursor substances, catalysts having a catalyst cell number of at least 60 cpsi (cpsi: cells per square inch–number of cells on the end face of the catalyst) and the catalyst volumes already described above are preferably used. The increasing counter-pressure (pressure loss over the catalyst) limits the catalyst cell number to not more than 800 cpsi for use in an ammonia gas generator. Particular preference is given to catalysts, in particular hydrolysis catalysts, which have a catalyst cell number of from 100 to 600 cpsi per inch$^2$ of end face, from 100 to 500 cpsi per inch$^2$ of end face and most preferably from 100 to 400 cpsi per inch$^2$ of end face of the catalyst.

With regard to the configuration of the catalyst unit, it has been found in tests that a cylindrical construction is particularly suitable. The carrier gas stream is thereby able to develop its full action. Other constructions, on the other hand, are less suitable because too vigorous turbulence can be observed. Accordingly, the present invention also relates to an ammonia gas generator which comprises a catalyst unit in the form of a cylinder.

In addition, it has been found to be particularly advantageous if the ammonia gas generator comprises a catalyst unit which in turn has at least one thermal insulation layer, in particular a thermal insulation layer of microporous insulating material.

Furthermore, it can be provided that the ammonia gas generator further comprises a metering unit for metering the solution of the ammonia precursor substance, which metering unit is provided upstream of the injection device. The ammonia to be generated can thus be controlled precisely via said metering unit. If, for example, increased emission of nitrogen oxides in the exhaust gas of an engine is registered, targeted control of the amount of precursor substance injected by the injection device allows a defined amount of ammonia to be released.

According to the present invention, ammonia precursor substances are understood as being chemical substances which can be converted into a solution and which are able to cleave ammonia by means of physical and/or chemical processes or release it in any other form. According to the present invention, there can be used as ammonia precursor compounds in particular urea, urea derivatives, guanidines, biguanidines and salts of these compounds as well as salts of ammonia. In particular, urea and guanidines or salts thereof can be used according to the present invention. In particular, salts that are formed from guanidines and organic or inorganic acids can be used. Guanidinium salts of the general formula (I) are to be regarded as being particularly preferred

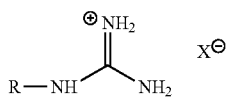

(I)

wherein

R=H, NH$_2$ or C$_1$-C$_{12}$-alkyl,

X$^\ominus$=acetate, carbonate, cyanate, formate, hydroxide, methylate or oxalate.

Guanidinium formate is particularly preferred.

Within the scope of the present invention, said guanidinium salts can be used in the form of a single substance or in the form of a mixture of two or more different guanidinium salts. According to a preferred embodiment, the guanidinium salts used according to the invention are combined with urea and/or ammonia and/or ammonium salts. Alternatively, however, aqueous urea solutions can also be used according to a further embodiment of the present invention. The mixing ratios of guanidinium salt with urea and ammonia or ammonium salts can be varied within wide ranges. However, it has been found to be particularly advantageous if the mixture of guanidinium salt and urea has a guanidinium salt content of from 5 to 60 wt. % and a urea content of from 5 to 40 wt. %, in particular from 5 to 35 wt. %. Furthermore, mixtures of guanidinium salts and ammonia or ammonium salts having a content of guanidinium salt of from 5 to 60 wt. % and of ammonia or ammonium salt of from 5 to 40 wt. % are also to be regarded as being preferred. Alternatively, however, a urea solution, in particular an aqueous urea solution, can also be used.

Ammonium salts which have been found to be successful are particularly compounds of the general formula (II)

(II)

wherein

R=H, NH$_2$ or C$_1$-C$_{12}$-alkyl,

X$^\ominus$=acetate, carbonate, cyanate, formate, hydroxide, methylate or oxalate.

The ammonia precursor substances used according to the invention, in particular guanidinium salts and optionally the further components, consisting of urea or ammonium salts, are used in the form of a solution, particularly water and/or a C$_1$-C$_4$-alcohol preferably being used as solvents. The aqueous and/or alcoholic solutions have a preferred solids content of from 5 to 85 wt. %, in particular from 30 to 80 wt. %.

It has been surprisingly shown that, according to the present invention, aqueous guanidinium formate solution in a concentration of from 20 to 60 wt. % and aqueous urea solution in a concentration of from 25 to 40 wt. % and aqueous mixtures of guanidinium formate and urea solutions, guanidinium formate and urea being present in the mixture in a concentration of from 5 to 60 wt. % guanidinium formate and from 5 to 40 wt. % urea, can be used particularly successfully.

The aqueous solution of the ammonia precursor substances, in particular of the guanidinium salts, the mixtures of guanidinium salts or the guanidinium salts in combination with urea in water, have a preferred ammonia-forming potential of from 0.2 to 0.5 kg of ammonia per liter of solution, in particular from 0.25 to 0.35 kg of ammonia per liter of solution.

On account of their compact construction, the ammonia gas generators described herein are particularly suitable for use in industrial plants, in internal combustion engines, for example diesel engines and petrol engines, as well as gas engines. Therefore, the present invention also includes the use of an ammonia gas generator of the described type and the use of the described method for reducing nitrogen oxides in exhaust gases from industrial plants, from internal combustion engines, for example diesel engines and petrol engines, and from gas engines. The present invention accordingly further includes an exhaust gas after-treatment system comprising an ammonia gas generator of the type described herein.

In particular, the present invention also includes an exhaust gas after-treatment system which further comprises a Venturi mixer, in particular the outlet for the ammonia gas formed by the ammonia gas generator and the Venturi mixer being connected, in particular connected directly, by a pipe. Most preferably, the invention also includes an exhaust gas after-treatment system which further comprises a Venturi mixer, wherein the outlet for the ammonia gas that is formed and the Venturi mixer are connected, in particular connected directly, by a pipe, and the Venturi mixer is a component of the exhaust gas pipe of a motor vehicle, the Venturi mixer being arranged upstream of an SCR catalyst in the direction of flow of the exhaust gas.

It has been found, particularly surprisingly, that by connecting the outlet of the ammonia gas generator for the ammonia gas directly to a Venturi mixer in an exhaust gas line of a motor vehicle, it is possible to build up a pressure gradient with which the ammonia that is generated can be introduced into the exhaust gas line without further auxiliary means. It is important here that the ammonia gas is introduced directly into the Venturi mixer. It is thus possible at the same time to achieve sufficiently high turbulence of the exhaust gas to be reduced and the ammonia gas.

Preferably, the arrangement of the injection device and the hydrolysis catalyst inside the ammonia generator according to the invention is such that the injection device comprises a nozzle which has a theoretical spray angle α of from 10° to 90°, and the distance of the nozzle opening from the end face of the catalyst is from 15 to 2000 mm.

Further preferably, the solution of the ammonia precursor substance is introduced in such a manner that the end face load of the catalyst is from 0.2 to 15 g/(h·cm$^2$), preferably at least 1.0 and even more preferably at least 3.0 g/(h·cm$^2$).

The present invention is explained in greater detail below by means of drawings and associated examples. In the drawings FIG. 1 is a schematic view of an ammonia gas generator according to the invention in axial cross section;

Figure 1:
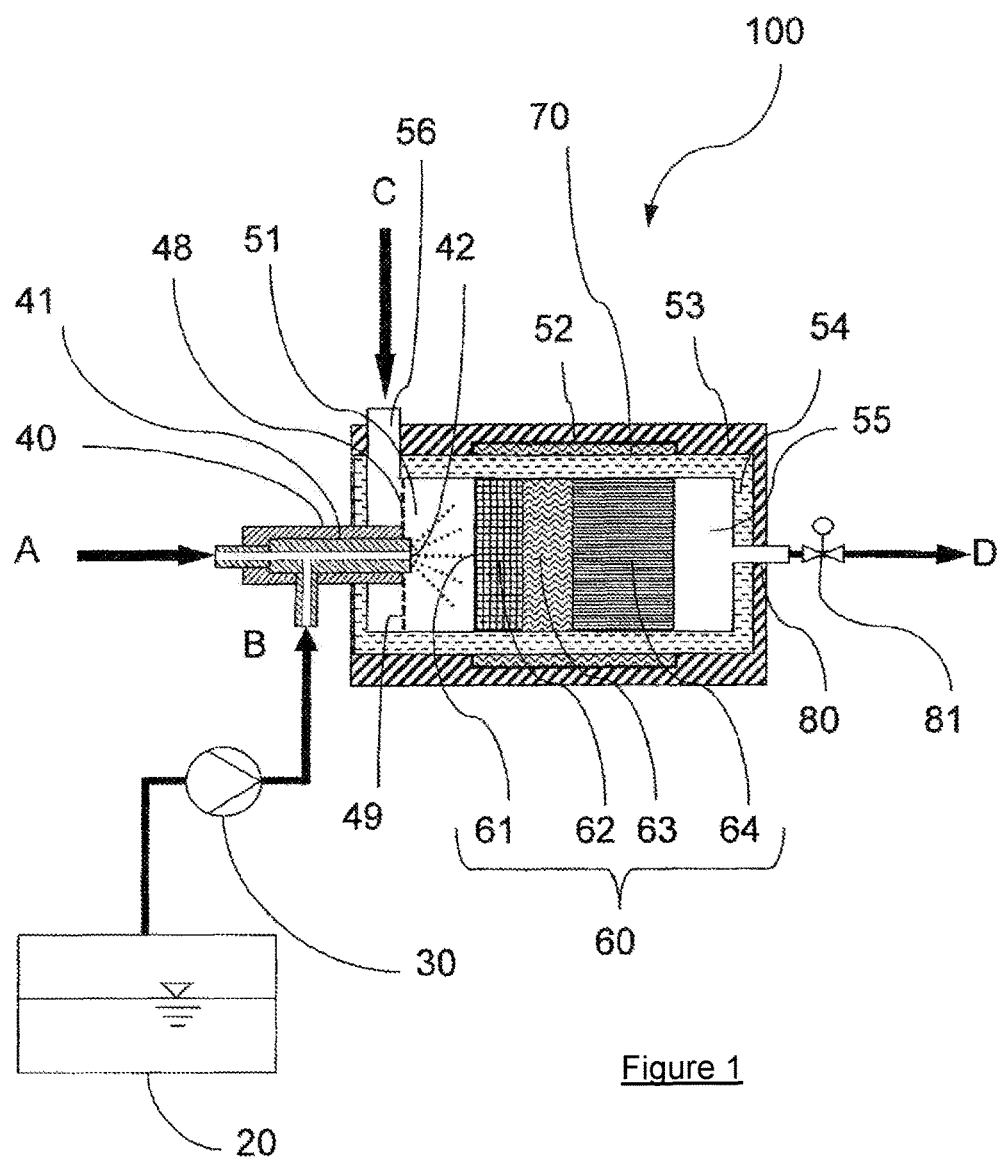

FIG. 1 shows a first ammonia gas generator (100) according to the present invention. The generator (100) is in the form of a cylinder and comprises an injection device (40), a catalyst unit (70) and an outlet (80) for the ammonia gas that is formed. The catalyst unit (70) consists of a multipart hydrolysis catalyst (60), a mixing chamber (51) and an outlet chamber (55). The mixing chamber is delimited in the longitudinal direction (direction of flow) by a perforated disc (48) having a plurality of openings. In the operating state, the ammonia precursor solution (B) from a storage container (20) is sprayed at a defined spray angle, via a metering pump (30), together with an atomising air stream (A) via a two-component nozzle (41) having a nozzle opening (42), into the mixing chamber (51) of the ammonia gas generator (100) and divided into fine droplets. In addition, a carrier gas stream (C) is introduced into the mixing chamber (51) via the inlet (56). The carrier gas stream (C) is guided onto a perforated disc (48), in the centre of which the nozzle opening (42) of the nozzle (41) is arranged. The nozzle opening (42) is situated at the level of the perforated disc. By means of the perforated disc (48), which has a plurality of openings (49), the carrier gas stream is divided into a plurality of partial streams of carrier gas parallel to the direction of flow of the catalyst unit, as a result of which there is generated a curtain flow with droplets of the injected ammonia precursor substance solution, which is guided axially towards the hydrolysis catalyst (60) onto the hydrolysis catalyst end face (61). The catalyst (60) is configured such that the first segment (62) constitutes an electrically heatable metal substrate having a hydrolytic coating. There then follow an unheated metal substrate catalyst (63), likewise having a hydrolytic coating, and an unheated catalyst (64) having a hydrolytic coating in the form of a mixer structure for better radial distribution. The ammonia gas (D) that is generated leaves the generator (100) together with the hot carrier gas stream via the outlet chamber (55) by means of the outlet (80) and valve (81). The generator can additionally be heated by jacket heating (52) around the housing (54) of the catalyst unit. Apart from the head region, in which the injection device (40) is situated, the ammonia gas generator (100) is enclosed by heat insulation (53) made of microporous insulating material.

Figure 2:
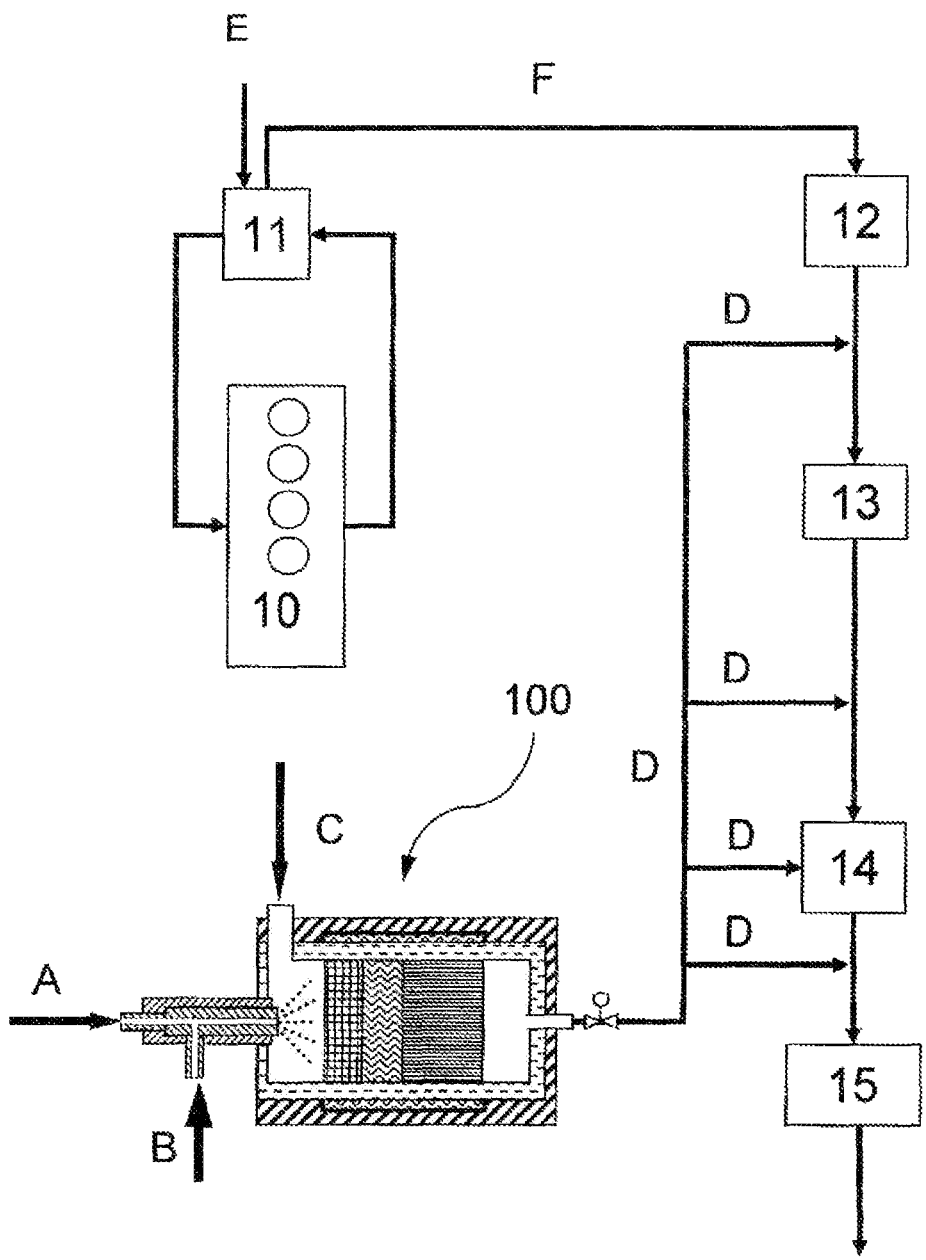
FIG. 2 is a schematic construction of an exhaust gas system in a motor vehicle.

FIG. 2 shows a schematic substance stream of an exhaust gas after-treatment in an internal combustion engine (10). The exhaust gas coming from the internal combustion engine (10) is guided via a charging unit (11), and incoming air (E) for the internal combustion engine is compressed countercurrently. The exhaust gas (F) is guided via an oxidation catalyst (12) in order to achieve a higher $NO_2$ concentration in relation to NO. The ammonia-containing gas stream (D) coming from the ammonia gas generator (100) can be added and mixed in both upstream and downstream of a particle filter (13). An additional gas mixer (14) in the form of a static mixer or, for example, a Venturi mixer can thereby be used. It can also be provided that the ammonia-containing gas stream (D) is introduced into the exhaust gas line at the level of the additional gas mixer (14) or into the additional gas mixer (14) or downstream of the additional gas mixer (14). In any case, however, the ammonia-containing gas stream (D) is introduced into the exhaust gas line upstream of the SCR catalyst (15). At the SCR catalyst (15), the NOx is reduced by means of the reducing agent $NH_3$ (SCR=selective catalytic reduction). The ammonia gas generator can be operated with separate carrier gas or with an exhaust gas partial stream.

Figure 3:
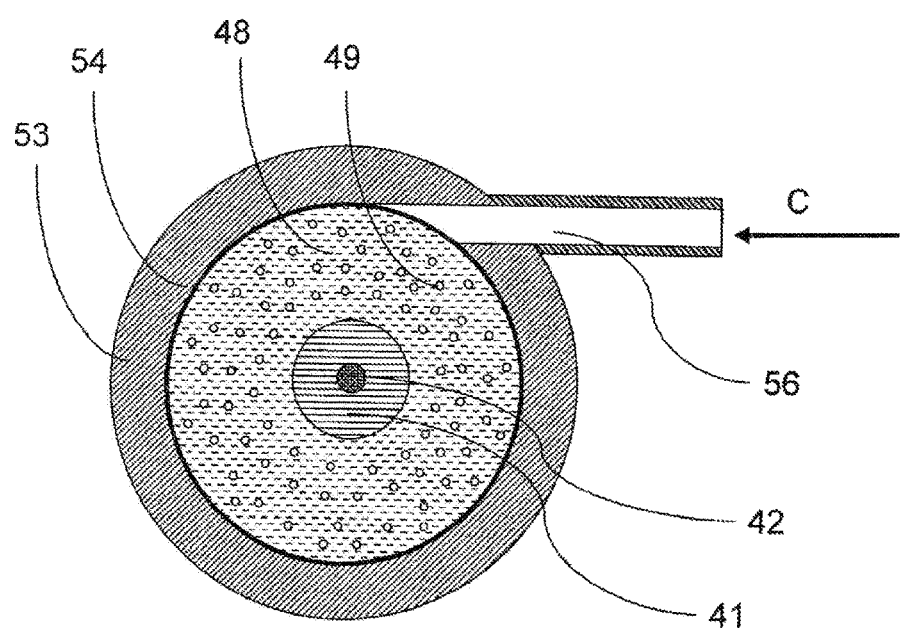
FIG. 3 is a radial cross section of the mixing chamber (plan view) in the region of the carrier gas stream supply.

FIG. 3 shows a detail view of the mixing chamber (51) in the region of the carrier gas stream supply. The housing (54) of the catalyst unit is enclosed in the region of the mixing chamber (51) by heat insulation (53) made of microporous insulating material. The carrier gas (C) is supplied in the head region of the ammonia gas generator, or in the head region of the mixing chamber (51). The inlet (56) for the carrier gas stream (C) is formed such that the inlet (56) is arranged behind the perforated disc (48) in the direction of flow of the catalyst. At the level of the nozzle opening (42) of the nozzle (41) there is arranged a perforated disc (48) having a plurality of holes (49). The perforated disc generates a plurality of carrier gas partial streams, which in turn produce in the generator a curtain flow directed downstream towards the catalyst.

EXAMPLES

Practical Example 1

The construction corresponds in principle to the ammonia gas generator shown in FIG. 1.

The ammonia generator is designed for a metered amount of from 50 to 2000 g/h $NH_3$ and is in the form of a cylindrical tubular reactor. In the head region there is arranged in the centre a two-component nozzle from Albonair (Albonair metering system) having a spray angle of alpha=20. The Sauter diameter in the chosen operating range is $D_{32}$=37 μm. The length of the mixing chamber is approximately 250 mm.

A perforated disc having a diameter of 90 mm is located around the nozzle opening over the entire cross section with a gap of 30 mm around the centrally arranged nozzle. The nozzle opening is situated at the level of the perforated disc. The drilled holes in the perforated disc are all 5 mm in size and are evenly distributed over the cross section.

In a further embodiment, the drilled holes become larger from the inside (3 mm) to the outside (8 mm). As a result of the perforated disc upstream of the nozzle outlet, a low back pressure of from 0.2 to 2 mbar is generated and thus a uniform axial flow of the transport gas stream and accordingly, particularly in the edge region, a flow which is positioned protectively around the wall region as a curtain (curtain flow), is generated. It is thereby prevented that droplets are thrown against the wall by an overly vigorous turbulent flow, that droplets lead to deposits, and that the degree of total ammonia formation falls from usually 97% to below 90%.

The entire region of the mixing chamber, including the metallic perforated disc, is coated with a hydrolysis catalyst (catalytically active $TiO_2$, anatase, washcoat of approximately 100 g/l, from Interkat) in order to avoid undesirable secondary reactions of sprayed solution which may land on the faces.

It has been shown that, as a result of the even distribution of the droplets on the catalyst end face, there is no undesirable overloading at certain points of the catalyst face. In this case, the entire face is used for converting the solution into ammonia without secondary products. As a result, deposits are not able to form, as has been shown in tests with running times of several 100 hours. If no deposits are observed, it is to be assumed that the ammonia precursor solution has been converted completely. Maintenance on account of deposits is no longer necessary in this case.

It has been shown that it is possible with this construction to use as the ammonia precursor solution aqueous guanidinium formate solution in a concentration of from 20% to 60% and aqueous urea solution in a concentration of from 25% to 40%, as well as aqueous mixtures of guanidinium formate and urea.

As a result of the droplets that are still present, cooling of approximately 120 to 150° C. takes place at the catalyst end face. For this reason, the reactor is constructed such that the amount of heat supplied with the hot carrier gas stream, the integrated heatable hydrolysis catalyst and further energy supplies introduce sufficient energy that, for the metered amount of solution, cooling below approximately 280° C. does not occur.

In addition to the sprayed solution, a hot carrier gas stream of approximately from 1 to 5 kg/h is likewise introduced in the head region of the ammonia gas generator in such a manner that it forms a curtain flow around the inside wall of the catalyst unit and is guided in a laminar manner through the mixing chamber. Sprayed droplets are thereby further prevented from coming into contact with the inside wall. The carrier gas stream is branched off upstream of the turbo and fed via a restrictor to the ammonia generator. Owing to the higher pressure upstream of the turbo, the necessary pressure difference of 10 mbar over the reactor from the mixing point in the exhaust gas stream upstream of the SCR catalyst is overcome, and the carrier gas stream is thus moved through the reactor. The temperature of the exhaust gas partial stream is between 250° C. and 550° C., depending on the operating state. Temperature regulation takes place in conjunction with temperature sensors (K type) arranged at the catalyst end face, in and downstream of the catalyst. All the outside surfaces of the reactor are enclosed by insulation. Only the head region, in which the injection of the solution is situated, is not insulated for the purpose of better heat dissipation.

Following the mixing chamber there is mounted a heatable metal substrate catalyst having a diameter of 90 mm and 300 cpsi (Emitec Emicat, maximum power 900 W). This is in the form of a hydrolysis catalyst, coated with catalytically active $TiO_2$ (anatase, washcoat of approximately 100 g/l, from Interkat), and is controlled such that the temperature at the catalyst end face is between 280 and 400° C. The amount of energy supplied is merely sufficient to compensate for cooling by evaporation of the droplets. In order to achieve a space velocity of up to a minimum of 7000 l/h, a further hydrolysis catalyst having 400 cpsi is provided downstream, so that a total catalyst volume of approximately 900 ml is obtained.

The ammonia generated at the hot hydrolysis catalyst flows freely out of the end section of the reactor in the base region, centrally out of an outlet opening. The outlet region is preferably conical in order to avoid the formation of turbulence at edges and thus deposits of any residues. The gas mixture from the ammonia gas generator is added to the engine exhaust gas stream upstream of the SCR catalyst preferably at a temperature >80° C. in order to avoid ammonium carbonate deposits, and is distributed homogeneously in said exhaust gas stream by a static mixer.

The material used for all the metal components is 1.4301 (V2A, DIN X 5 CrNi18-10) or alternatively 1.4401 (V4A, DIN X 2 CrNiMo 17-12-2), 1.4767 or other Fe—Cr—Al alloys typically used for exhaust gas catalysts.

Practical Example 2

In practical example 2, the ammonia generator is formed such that, instead of a two-component nozzle, a single-component nozzle (injector, Hilite Gen 2 Liquid Only) having a comparable spray pattern is used. The atomisation is thereby achieved wholly without additional compressed air. The Sauter diameter in this embodiment is $D_{32}=29$ μm. Accordingly, compressed air or an additional air pump for operating the atomisation is not necessary in this embodiment.

Practical Example 3

In practical example 3, the ammonia generator is operated in such a manner that ambient air is drawn through the ammonia generator as the carrier gas stream. The generator corresponds to the embodiment in example 1. Cold ambient air is used as the carrier gas stream instead of a hot exhaust gas side stream. The temperature of the ambient air is between 10° C. and 25° C. The pressure difference over the reactor to the mixing point in the exhaust gas stream is overcome by means of a Venturi nozzle in the exhaust gas stream. A Venturi gas mixer is fitted in the exhaust gas stream upstream of the SCR catalyst in such a manner that a corresponding low pressure draws ambient air as the carrier gas stream into and through the reactor and mixes gas enriched with ammonia into the exhaust gas stream. The mixing point of the ammonia-containing gas from the reactor is located centrally in the narrowest cross section in the Venturi nozzle integrated into the exhaust gas flow. The gas is drawn out of the reactor via a plurality of drilled holes in the Venturi nozzle constriction and is supplied to the exhaust gas stream in an evenly radially distributed manner.

The invention claimed is:

1. An ammonia gas generator for generating ammonia from a solution of an ammonia precursor substance, comprising:
a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{Mix}$ sufficient to wet a catalyst end face of the catalyst with the solution of the ammonia precursor substance;
an injection device for introducing the solution of the ammonia precursor substance into the mixing chamber;
at least one inlet for a carrier gas; and,
an outlet for the ammonia gas that is formed,
wherein the ammonia gas generator further comprises a perforated disc through which the carrier gas is introduced into the mixing chamber in the form of a plurality of parallel jets in a manner perpendicular to the catalyst end face; and wherein the mixing chamber is operable to deposit droplets of the solution of the ammonia precursor substance on the catalyst end face.

2. The ammonia gas generator of claim 1 wherein the ammonia gas generator comprises a perforated disc, in the centre of which at least one nozzle opening of a nozzle is arranged.

3. The ammonia gas generator of claim 1 wherein the injection device comprises a nozzle which generates drops having a Sauter diameter $D_{32}$ of from 26 to 100 μm.

4. A method for generating ammonia from a solution of an ammonia precursor substance using an ammonia gas generator comprising:
a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{Mix}$ sufficient to wet a catalyst end face of the catalyst with the solution of the ammonia precursor substance;
an injection device for introducing the solution of the ammonia precursor substance into the mixing chamber;
at least one inlet for a carrier gas; and,
an outlet for the ammonia gas that is formed,
wherein the carrier gas is introduced into the mixing chamber in the form of a plurality of parallel jets in a manner perpendicular to the catalyst end face, and the parallel jets are generated by a perforated disc; and wherein the mixing chamber is operable to deposit droplets of the solution of the ammonia precursor substance on the catalyst end face.

5. The method of claim 4 wherein the solution of the ammonia precursor substance is introduced into the mixing chamber in the form of drops having a Sauter diameter $D_{32}$ of from 26 µm to 100 µm, from 26 µm to 49 µm, or from 26 µm to 40 µm.

6. The method of claim 4 wherein there is used in the method a carrier gas which has a temperature $T_{(K)}$ in the range of from 10° C. to 550° C.

7. The method of claim 4 wherein there is used in the method a carrier gas which is introduced into the mixing chamber at a temperature $T_{(K)}$ in the range of from 250° C. to 550° C.

8. The method according of claim 4 wherein there is used in the method a carrier gas which has a temperature $T_{(K)}$ in the range of from 10° C. to 200° C.

9. The method of claim 4 wherein the solution of the ammonia precursor substance is introduced in the form of an aerosol into the plurality of parallel jets of the carrier gas.

10. The method of claim 4 wherein the solution of the ammonia precursor substance is introduced into the mixing chamber separately from the carrier gas.

11. The method of claim 4 wherein the carrier gas is introduced into the mixing chamber in parallel with the solution of the ammonia precursor substance in the form of a bundle of parallel jets.

12. The method of claim 4 wherein there is used as the solution of an ammonia precursor substance an aqueous solution comprising urea, an ammonium salt, a guanidinium salt or mixtures thereof.

13. The method of claim 4 wherein the carrier gas is introduced into the mixing chamber with a first pressure at the inlet for the carrier gas that is higher than a second pressure at the outlet for the ammonia gas.

14. The method of claim 4 wherein the carrier gas is introduced into the mixing chamber with a pressure which is necessary to overcome a pressure difference delta $p_{(K)}$ in the range of from 10 mbar to 100 mbar between the inlet for the carrier gas and the outlet for the ammonia gas.

15. The method of claim 4 wherein the carrier gas is drawn through the mixing chamber by a low pressure downstream of the ammonia gas generator.

16. The method of claim 4 wherein the catalyst is a heated hydrolysis catalyst for hydrolysis of the ammonia precursor substance.

17. A method for reducing nitrogen oxides in exhaust gases of internal combustion engines, comprising the method of claim 4 for generating ammonia wherein the resulting ammonia gas is introduced into the exhaust gas line of the internal combustion engine directly into a Venturi mixer.

18. A method for reducing nitrogen oxides in exhaust gases from internal combustion engines, from gas engines, from diesel engines or from petrol engines, comprising employing the method of claim 4.

19. The ammonia gas generator of claim 1, wherein the mixing chamber is delimited in a direction of flow on a first side by the catalyst end face and on a second side by the perforated disc.

20. The method of claim 4, wherein the mixing chamber is delimited in a direction of flow on a first side by the catalyst end face and on a second side by the perforated disc.

21. The method of claim 4, wherein the solution of the ammonia precursor substance is introduced into the mixing chamber together with the carrier gas.

22. An ammonia gas generator for generating ammonia from a solution of an ammonia precursor substance, comprising:
 a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{mix}$ sufficient to wet a catalyst end face of the catalyst with the solution of the ammonia precursor substance;
 an injection device for introducing the solution of the ammonia precursor substance into the mixing chamber;
 at least one inlet for a carrier gas; and,
 an outlet for the ammonia gas that is formed,
 wherein the ammonia gas generator further comprises a perforated disc through which the carrier gas is introduced into the mixing chamber in the form of a plurality of parallel jets in a manner perpendicular to a catalyst end face of the catalyst; and
 wherein the ammonia gas generator is not part of an exhaust gas line and is operable independent of whether the carrier gas is exhaust gas.

23. A method for generating ammonia from a solution of an ammonia precursor substance using an ammonia gas generator, comprising:
 a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{mix}$ sufficient to wet a catalyst end face of the catalyst with the solution of the ammonia precursor substance;
 an injection device for introducing the solution of the ammonia precursor substance into the mixing chamber;
 at least one inlet for a carrier gas; and,
 an outlet for the ammonia gas that is formed,
 wherein the carrier gas is introduced into the mixing chamber in the form of a plurality of parallel jets in a manner perpendicular to a catalyst end face of the catalyst, and the parallel jets are generated by a perforated disc; and
 wherein the ammonia gas generator is not part of an exhaust gas line and is operable independent of whether the carrier gas is exhaust gas.

24. An ammonia gas generator for generating ammonia from a solution of an ammonia precursor substance, comprising:
 a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{mix}$ sufficient to wet a catalyst end face of the catalyst with the solution of the ammonia precursor substance;
 an injection device for introducing the solution of the ammonia precursor substance into the mixing chamber;
 at least one inlet for a carrier gas; and,
 an outlet for the ammonia gas that is formed,
 wherein the ammonia gas generator further comprises a perforated disc through which the carrier gas is introduced into the mixing chamber in the form of a plurality of parallel jets in a manner perpendicular to a catalyst end face of the catalyst; and
 wherein complete conversion of the ammonia precursor substance to ammonia occurs before the ammonia formed at the outlet is introduced into an exhaust gas stream.

25. A method for generating ammonia from a solution of an ammonia precursor substance using an ammonia gas generator, comprising:
- a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{mix}$ sufficient to wet a catalyst end face of the catalyst with the solution of the ammonia precursor substance;
- an injection device for introducing the solution of the ammonia precursor substance into the mixing chamber;
- at least one inlet for a carrier gas; and,
- an outlet for the ammonia gas that is formed,
- wherein the carrier gas is introduced into the mixing chamber in the form of a plurality of parallel jets in a manner perpendicular to a catalyst end face of the catalyst, and the parallel jets are generated by a perforated disc; and
- wherein complete conversion of the ammonia precursor substance to ammonia occurs before the ammonia formed at the outlet is introduced into an exhaust gas stream.

26. An ammonia gas generator for generating ammonia from a solution of an ammonia precursor substance, comprising:
- a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{Mix}$;
- an injection device for introducing the solution of the ammonia precursor substance into the mixing chamber;
- at least one inlet for a carrier gas; and,
- an outlet for the ammonia gas that is formed,
- wherein the ammonia gas generator further comprises a perforated disc through which the carrier gas is introduced into the mixing chamber in the form of a plurality of parallel jets in a manner perpendicular to the catalyst end face;
- wherein the mixing chamber is operable to deposit droplets of the solution of the ammonia precursor substance on the catalyst end face; and
- wherein the mixing chamber is arranged to cause droplets of the solution of the ammonia precursor substance to wet the catalyst end face.

27. A method for generating ammonia from a solution of an ammonia precursor substance using an ammonia gas generator comprising:
- a catalyst unit which comprises a catalyst for the decomposition and/or hydrolysis of ammonia precursor substances into ammonia and a mixing chamber provided upstream of the catalyst, the catalyst having a catalyst volume $V_{Cat}$ and the mixing chamber having a mixing chamber volume $V_{Mix}$;
- an injection device for introducing the solution of the ammonia precursor substance into the mixing chamber;
- at least one inlet for a carrier gas; and,
- an outlet for the ammonia gas that is formed,
- wherein the carrier gas is introduced into the mixing chamber in the form of a plurality of parallel jets in a manner perpendicular to the catalyst end face, and the parallel jets are generated by a perforated disc;
- wherein the mixing chamber is operable to deposit droplets of the solution of the ammonia precursor substance on the catalyst end face; and
- wherein the mixing chamber is arranged to cause droplets of the solution of the ammonia precursor substance to wet the catalyst end face.

* * * * *